United States Patent [19]

Hässler

[11] Patent Number: 4,760,230

[45] Date of Patent: Jul. 26, 1988

[54] METHOD AND AN APPARATUS FOR HEATING GLASS TUBES

[75] Inventor: Yngve Hässler, Lidingö, Sweden

[73] Assignee: Stiftelsen Institutet for Mikrovagsteknik vid Tekniska Hogskolan i Stockholm, Stockholm, Sweden

[21] Appl. No.: 910,471

[22] Filed: Sep. 23, 1986

[30] Foreign Application Priority Data

Sep. 27, 1985 [SE] Sweden .............................. 8504498

[51] Int. Cl.$^4$ .............................................. H05B 6/78
[52] U.S. Cl. ...................... 219/10.55 M; 219/10.55 A; 219/10.55 F
[58] Field of Search ................. 219/10.55 A, 10.55 R, 219/10.55 F, 10.55 M; 34/1

[56] References Cited

U.S. PATENT DOCUMENTS

| | | | |
|---|---|---|---|
| 3,461,261 | 8/1969 | Lewis et al. ................. | 219/10.55 A |
| 3,465,114 | 9/1969 | Bleackley et al. ........... | 219/10.55 A |
| 4,144,434 | 3/1979 | Chiron et al. ................ | 219/10.55 F |
| 4,237,145 | 12/1980 | Risman et al. .............. | 219/10.55 A |
| 4,626,640 | 12/1986 | van der Heijden .......... | 219/10.55 A |

*Primary Examiner*—M. H. Paschall
*Attorney, Agent, or Firm*—Nies, Webner, Kurz & Bergert

[57] ABSTRACT

A method of heating glass tubes, particularly quartz tubes for the manufacture of optical fibres, where the tube is pre-heated, preferably by means of a gas flame, whereafter the tube is heated by means of microwave energy generated by a microwave generator (1), by introducing the tube axially into a microwave cavity (3) comprising in its end walls (6,7) or end surfaces openings for the tube. According to the invention, at least one electrical field is given a field image according to a TM-0n0-mode, preferably according to the TM-020-mode, which mode has a maxima (10) along the central axis (9;c-c) of the cavity (3) and a minima (11,12) on each side of and radially spaced from the central axis (9;c-c), where the electrical field portion located between the minima (11,12) is used for heating the wall of the glass tube (8). According to a preferred embodiment, an additional electrical field is caused to be formed by means of a second microwave generator (15), which field is given a field image according to a TE-0In-mode, preferably according to the mode TE-011, which field therewith is superposed upon the field according to the TM-0n0-mode.

6 Claims, 1 Drawing Sheet

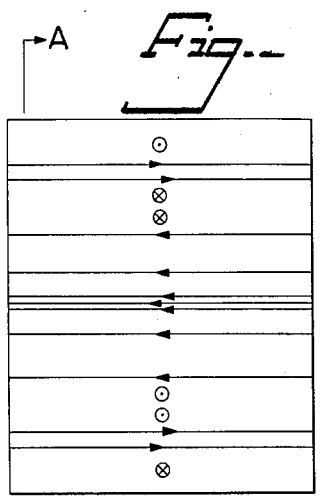
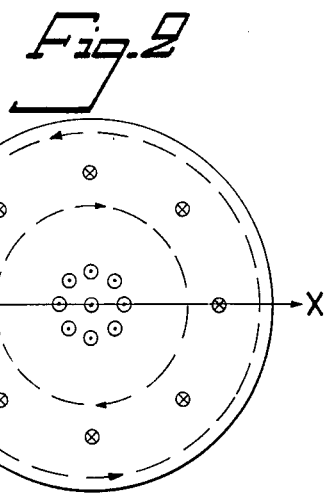
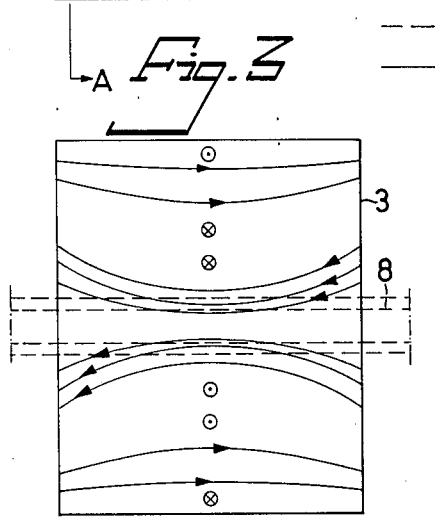
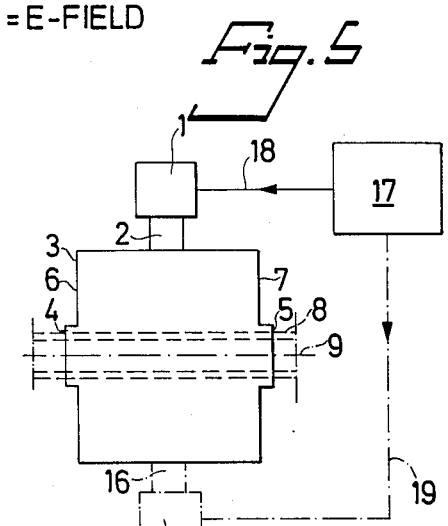
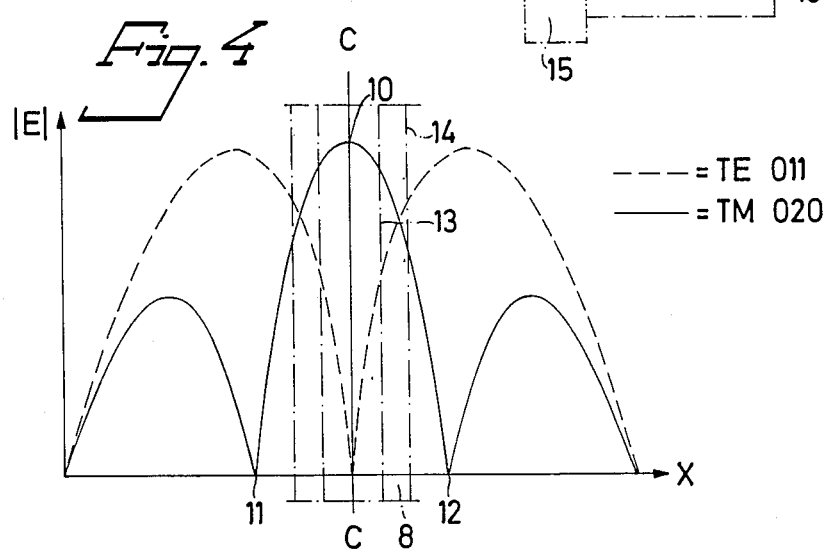

METHOD AND AN APPARATUS FOR HEATING GLASS TUBES

This invention relates to a method and an apparatus for heating glass tubes, especially quartz tubes for the manufacture of optical fibres.

BACKGROUND OF THE INVENTION

In the PS-SE . . . (patent application No. 8403529-4), which is a priority application upon which applicant's co-pending U.S. application Ser. No. 747,830, filed June 24, 1985, and replaced by pending U.S. application Ser. No. 120,782, is based, a method and an apparatus are disclosed, which are used for the heating of thick-walled glass tubes at the manufacture of optical fibres. According to said patent the tube is heated by means of microwave energy.

The method according to the said patent is especially characterized in that the tube is pre-heated to a temperature of about 1000° C.–1500° C., preferably by means of a gas flame in a manner known per se, whereafter the tube is heated by means of microwave energy generated by a microwave generator, by introducing the tube axially into a microwave cavity comprising in its two end walls openings for the tube, and the electrical field strength is given a field image including only one tangential component, according to TE-01n-mode, preferably according to the mode TE-011, whereby the electrical field is formed so as to be tangential to the surfaces of the tube, and formed so that the electrical field strength is zero adjacent the surfaces of the cavity.

According to a preferred embodiment of said patent the microwave cavity is of cylindrical configuration and made of metal, and its two end walls include, as mentioned, openings, through which the tube to be heated is axially introduced.

The cavity described in said Swedish patent involves the problem of offering relatively limited possibility of supplying the cavity with such power, that a high temperature of the tube is obtained without thereby causing electrical arcing.

This limitation partly is due to the fact that the thermal dissipation from the heated tube is high, and partly because at the passing of the cavity relative to the tube the hot portion of the tube is moved to one end of the cavity, whereby the electrical field is utilized for heating the tube already heated to an extent greater than desired. It is hereby difficult to supply sufficiently high power to the centre of the cavity, i.e. where the tube portion to be heated is located, without giving rise to electric arcing.

By using the said TE-01n-mode, the cavity is given a relatively high so-called Q-value. Considering that the maximum power to be supplied is limited by the necessity of preventing electric arcing, it is desired to be able to reduce the Q-value of the cavity and thereby to be able to supply higher power without causing electric arcing.

The said TE-011-mode when used in a cylindric cavity yields a distribution, which is highly advantageous at the heating of quartz tubes to collapsing temperature. The electrical field is zero at the envelope surface of the cavity and in the cavity centre, while the field strength is high in the walls of a thick-walled glass tube.

At the manufacture of optical fibres, the collapsing is preceded by a deposition phase and a sintering phase.

On the inner wall of the glass tube layers of pure quartz $SiO_2$ are deposited. In certain layers also germanium dioxide $GeO_2$ is deposited as a doping agent. This is effected in that $SiCl_4$ and oxygen $O_2$, together with $GeCl_4$, are introduced into the tube. $SiO_2$ and $GeO_2$ are herewith deposited on the inner surface of the tube. In order for these reactions to take place, it is necessary to heat the interior of the tube to about 1400° C. This is normally carried out by passing a burner along the entire length of the tube, while rotating the tube about its axis. Firstly, $SiCl_4$ and $O_2$ are introduced, whereupon $SiO_2$ is deposited and forms a porous layer. When the burner passes the porous layer, the layer sinters to form a transparent $SiO_2$. This deposition is repeated, whereafter $GeCl_4$ is mixed with the $SiCl_4$ gas, so as to develop a correct so-called index profile. Normally, 30 to 100 layers are applied during the deposition phase. After the deposition phase and sintering phase, the temperature of the burner is raised so as to heat the tube to about 2200° C. At this temperature the surface tension causes the tube to draw together, i.e. to collapse. After the burner has been traversed a few times, the tube forms a rod, i.e. a so-called preform, from which an optical fibre can be drawn.

During the deposition phase and sintering phase a sufficiently high temperature is desired to prevail on the inside of the tube wall. As during the collapsing phase, the problem exists also during these phases that the maximum supplied power is limited by the necessity of preventing electric arcing.

SUMMARY OF THE INVENTION

The present invention meets the requirement of obtaining a high temperature on the inside of the tube wall, and at the same time the method and apparatus according to the invention render it possible to supply a power higher than possible with the TE-011-mode without giving rise to electric arcing.

The present invention can advantageously be applied during the deposition and sintering phases, but can also, as explained below, be used during the collapsing phase.

The present invention, thus, relates to a method of heating glass tubes, particularly quartz tubes for the manufacture of optical fibres, at which method the tube is pre-heated, preferably by means of a gas flame, whereafter the tube is heated by means of microwave energy generated by a microwave generator, by introducing the tube axially into a microwave cavity comprising in its end walls or end surfaces openings for the tube. The invention is characterized in that at least one electrical field is given a field image according to a TM 0n0-mode, preferably according to the TM 020-mode, which mode has a maxima along the central axis of the cavity and a minima on each side of and radially spaced from the central axis, and that the electrical field portion located between the said minima is utilized for heating the wall of said glass tube.

The invention also relates to an apparatus of the kind and having the main characterizing features as defined in claim 4.

BRIEF DESCRIPTION OF THE DRAWINGS

The invention is described in greater detail in the following, partially with reference to an embodiment thereof shown in the accompanying drawing, in which FIG. 1 shows field lines in an unloaded cylindric cavity by way of a section along the longitudinal axis of the cavity, FIG. 2 shows field lines according to FIG. 1 by way of a section across the longitudinal axis thereof, FIG. 3 shows field lines in the section shown in FIG. 1 after a load has been introduced into the cavity, FIG. 4 shows the amount of the electrical field distribution in radial direction when a load is in the cavity according to two different modes, FIG. 5 shows schematically a cavity and its connection to a microwave source.

DETAILED DESCRIPTION OF THE DISCLOSURE

The present invention relates to a method and an apparatus for the manufacture of optical fibres from a glass tube, where the glass tube first is pre-heated, preferably by means of a gas flame, to a temperature of about 1000° C. to 1500° C., because the dielectric losses in glass increase substantially from room temperature up to 1000° C.–1500° C.

At this temperature and from it the tube is heated by means of microwave energy, which is generated by means of a microwave generator 1, which via a waveguide 2 is coupled to a microwave cavity 3 of metal. The microwave cavity 3 is provided with openings 4,5 in the end walls 6,7 or end surfaces of the cavity. Through these openings 4,5 the glass tube 8 to be heated is introduced, as shown by dashed lines in FIG. 5. During the heating process the cavity is traversed along the tube in a reciprocatory movement.

According to the invention, at least one microwave generator 1 is coupled so via a wave guide 2 to the cavity 6, that an electrical field is given a field image according to a TM-0n0-mode, preferably according to the TM 020-mode, and so that the electrical field has a maxima along the central axis 9 of the cavity 6 and a minima on each side of and radially spaced from the central axis. A cavity further is so utilized that a longitudinal axis through the centre of said openings 4,5 coincides with said central axis 9. Hereby the electrical field portion located between said minima is utilized for heating the wall of the glass tube 8.

The above information on the electrical field is explained in greater detail in the following with reference to FIGS. 1–4.

The components of the electrical field at an undisturbed cylindric TM-020 mode appear from FIGS. 1 and 2, of which FIG. 2 is a section along the line A—A in FIG. 1. The electrical field (E-FIELD) is shown by fully drawn lines, and the magnetic field (H-FIELD) is shown by dashed lines. Crosses indicate field lines running downward in the plane of the paper, and dots indicate field lines running upward out of the plane of the paper. The field lines of the electrical field, as can be seen, run in parallel with the envelope surface of the cavity and terminate at the end walls or end surfaces thereof.

When a quartz tube 8 is introduced into such a cavity 3, as shown in FIG. 3, the field image is distorted. Hereby appear also electrical field components, which are normal to the quartz tube. At an undisturbed cavity, normally directed components appear only at the end surfaces of the cavity. Even when the field image is distorted in response to the load, i.e. the glass tube, in the present application and its claims the said mode designations are used, because they best describe the field image. The same applies also when the cavity is not entirely cylindric, although the modes are defined for cylindric cavities.

It appears from FIG. 3 that the electrical field is concentrated to the glass tube. In FIG. 4 the distribution of the electrical field (E) is shown as a function of the distance X over the cross-section of the cavity along a diameter, see FIG. 2. In FIG. 4 the said central axis 9 is marked by C—C, and the glass tube 8 is shown by dash-dotted lines. In FIG. 4 the field image for the mode TM-020 is marked by fully drawn lines. From FIG. 4 the said maximum 10 and said minima 11,12 appear, which minima are zero positions. The TM-020 mode is characterized by a top located axial-symmetrically in the cavity. The letter "n" indicates the number of tops located along a radius from the central axis c—c outward to the envelope surface of the cavity. The tops located outside the central top always are lower. The invention, therefore, is not restricted to the TM-020-mode. At least the modes TM-010; TM-030 and TM-040 can be used.

As appears from FIG. 4, the TM-020-mode yields a high pocketed electrical field energy in the glass tube 8. The field strength decreases from the inside 13 of the tube to its outside 14 and decreases rapidly outside the glass tube to said minima 11,12.

By suitably adapting the cavity to the glass tubes to be heated, it is, thus, possible to obtain a substantially higher field strength at the inside of the glass tube than at its outside. This is especially advantageous during the afore-mentioned deposition and, respectively, sintering phase. During these phases only the inner surface of the glass tube need assume a high temperature, for example 1400°–1500° C. Due to the fact that the electrical field is high at the inner surface of the glass tube and lower in the remaining wall parts of the glass tube, the heating is concentrated to the inner surface of the tube. For this reason the power applied to the cavity must not be as high as, for example, when the mode TE-011 is used during the deposition and, respectively, sintering phase. In FIG. 4 the field distribution according to the mode TE-011 is shown by dashed lines. It appears from FIG. 4, that the mode TE-011 yields a stronger heating of the outside of the tube than of the inside thereof.

The fact that a lower power is sufficient during the deposition and, respectively, sintering phase when the TM-020 mode is used, compared with using the TE-011-mode, implies a.o. the essential advantage that the risk of electric arcing is reduced considerably.

Compared with the TE-011-mode, the TM-020-mode implies that more electrical field energy is stored in the glass tube and that the field strength decreases to the outer surface of the tube. The greater amount of electrical field energy in its turn implies that a higher load of the cavity is obtained with the TM-020-mode, i.e. that a lower Q-value is obtained. Due to the lower Q-value a higher electrical field strength can be applied without electrical arcing occuring for an unchanged value of the loss factor tan δ. Hereby the advantage is achieved that the tube must not be pre-heated to a temperature as high as when the TE-011 mode is used. Furthermore, due to the higher permissible power, a higher maximum temperature of the tube is achieved by using the TM-020-mode.

It is obvious, thus, that the TM-020-mode is highly advantageous especially during the deposition and, respectively, sintering phase when primarily the inside of the tube is to be heated. Depending on the wall thickness, diameter and quality of the tube, however, often also the tube wall must be heated to such an extent that the tube does not crack due to thermal strains.

The fact, however, that the field strength at the TM-020-mode decreases substantially to the outer surface of the tube, gives rise to the disadvantage that it can be difficult to heat the tube to its collapsing temperature. Radiation losses from the outside of the tube, however, can be limited by designing the cavity with a high-reflecting inside and giving the cavity a substantially spherical configuration in order to concentrate the reflection to the tube.

According to a preferred embodiment of the invention, however, an additional electrical field is caused to be formed in the cavity, which field is given a field image according to a TE-01n-mode, preferably according to the mode TE-011. For this reason an additional microwave generator 15 is provided, which via a wave guide 16 is so coupled to the cavity 3, that a TE01n-mode, preferably the TE-011mode, appears in the cavity. Hereby the TE-011-mode and TM-020-mode, or in the more general case the TE-01n-mode and TM-0n0-mode, are superposed upon each other and are independent of each other.

It is hereby possible to supply a substantially higher total power to the cavity, compared with the utilization of only one of the modes. Not only a higher power can be supplied, but also the very important advantage is achieved that the strength of the total electrical field is distributed much more uniform in radial direction through the tube wall, which appears from FIG. 4. The total field, namely, consists of the total of the two fields in FIG. 4.

According to a preferred embodiment of the invention, both modes are utilized at least during the collapsing phase, where it is advantageous to be able to supply high power and to obtain a uniform temperature over a cross-section of the tube.

According to a specific method, therefore, at least the TM-020-mode is utilized during the deposition phase and sintering phase, and both the TM-020-mode and TE-011-mode are utilized during the collapsing phase.

For this reason a control device 17 of a suitable known kind is provided, which via conductors 18,19 is capable to connect and disconnect the two respective microwave generators 1;15.

In FIG. 4 the field distribution is shown in a cross-section of a cylindric cavity. As indicated above, however, the configuration of the cavity can deviate from a cylindric one. According to one embodiment of the invention, however, a cavity is used which is axial-symmetrical in respect of said central axis 9, which cavity preferably is substantially cylindric.

The present invention must not be regarded restricted to the configuration of the cavities stated above by way of example or to the physical connection of the generators 1,15 stated above, but the invention can be varied within its scope defined by the attached claims.

I claim:

1. A method of heating glass tubes, particularly quartz tubes for the manufacture of optical fibres, by preheating the tube, preferably by means of a gas flame, whereafter the tube is heated by means of microwave energy generated by a microwave generator (1), by introducing the tube axially into a microwave cavity (3) comprising in its end walls (6,7) or end surfaces openings for the tube, characterized in that two electrical fields according to different modes are caused to be formed in said cavity, in that a first of said electrical fields is caused to be formed by a first microwave generator (1) and the second of said electrical fields by a second microwave generator (15) in that the first electrical field is given a field image according to a TM-0n0-mode, preferably according to the TM-020-mode, which mode has a maxima (10) along the central axis (9;c—c) of the cavity and a minima (11,12) on each side of a radially spaced from the central axis (9;c—c), where the electrical field portion located between said minima (11,12) is utilized for heating the wall of said glass tube (8), and in that the second electrical field is given a field image according to a TE-01n-mode, preferably according to the mode TE-011, which field therewith is simultaneous with the superposed upon the field according to the TM-0n0-mode.

2. A method as defined in claim 1, characterized in that at least said firstmentioned microwave generator (1) is caused to generate said electrical fields during a deposition and, respectively, sintering phase, where layers with different substances are applied on the inside of the glass tube, and that during a subsequent collapsing phase, where the tube is to be collapsed to a rod, the said two microwave generators (1;15) are caused to generate each its respective electrical field according to the modes TM-0n0 and, respectively, TE-01n.

3. A method as defined in claim 1, characterized in that a microwave cavity (3) of metal is used, which is axial-symmetrical in respect of an axis (9) extending through the centre of said openings (4,5).

4. An apparatus for heating glass tubes, particularly quartz tubes for the manufacture of optical fibres, which apparatus comprises means for pre-heating the glass tube, preferably a gas flame, and comprises microwave generators connected to a microwave cavity, which is provided with openings in its end walls or end surfaces for passing a glass tube through the cavity, characterized in that a first and a second microwave generator (1;15) via a respective wave guide (2;16) are connected to the cavity (3), so that a first electrical field from one of said generators is given a field image according to a TM-0n0-mode, preferably according to the TM-020-mode, which mode has a maxima (10) along the central axis (9;c—c) of the cavity (3) and a minima (11,12) on each side of and radially spaced from the central axis (9;c—c) and so that a second electrical field from the other of said generators is given a field image according to a TE-01n-mode, preferably according to the mode TE-011, which second field therewith is simultaneous with and superposed upon the field according to the TM-0n0-mode, and in that a longitudinal axis through the centre of said openings (4,5) coincides with said central axis (9).

5. An apparatus as defined in claim 4, characterized in that a control device (17) is capable to connect and disconnect each of the said two microwave generators (1,15).

6. An apparatus as defined in claim 4, characterized in that the microwave cavity (3) is of metal and axial-symmetrical in respect of said central axis (9).

* * * * *

UNITED STATES PATENT AND TRADEMARK OFFICE
CERTIFICATE OF CORRECTION

PATENT NO. : 4,760,230
DATED : July 26, 1988
INVENTOR(S) : YNGVE HASSLER

It is certified that error appears in the above-identified patent and that said Letters Patent is hereby corrected as shown below:

IN THE CLAIMS:

Column 6, line 11, (Claim 1) change "a" to --and--

Column 6, line 17, (claim 1) change "the" (first occurrence) to --and--.

Signed and Sealed this

Fourteenth Day of February, 1989

Attest:

DONALD J. QUIGG

Attesting Officer

Commissioner of Patents and Trademarks